United States Patent [19]
Yuasa et al.

[11] Patent Number: 5,634,722
[45] Date of Patent: Jun. 3, 1997

[54] LINEAR MOTION ROLLING GUIDE UNIT

[75] Inventors: Kouhei Yuasa, Gifu; Masahide Saitoh, Mino, both of Japan

[73] Assignee: Nippon Thompson Co., Ltd., Tokyo, Japan

[21] Appl. No.: 685,957

[22] Filed: Jul. 22, 1996

[30] Foreign Application Priority Data

Jul. 31, 1995 [JP] Japan .................................. 7-213078

[51] Int. Cl.⁶ .................................................. F16C 33/76
[52] U.S. Cl. ....................................... 384/15; 384/44
[58] Field of Search ........................... 384/43, 44, 45, 384/15

[56] References Cited

U.S. PATENT DOCUMENTS

| | | | |
|---|---|---|---|
| 4,040,679 | 8/1977 | Teramachi | 384/45 |
| 4,886,376 | 12/1989 | Osawa | 384/15 |
| 5,399,023 | 3/1995 | Winkelmann et al. | 384/15 X |
| 5,547,285 | 8/1996 | Hutzel et al. | 384/15 |
| 5,556,206 | 9/1996 | Bigwood | 384/15 |

FOREIGN PATENT DOCUMENTS

| | | |
|---|---|---|
| 248612 | 4/1990 | Japan . |
| 423818 | 2/1992 | Japan . |
| 6264923 | 9/1994 | Japan . |
| 638177 | 10/1994 | Japan . |

*Primary Examiner*—Thomas R. Hannon
*Attorney, Agent, or Firm*—Browdy and Neimark

[57] ABSTRACT

The linear motion rolling guide unit has sealing devices that can be applied without having to modify the fundamental specifications of the existing unit and which can also be installed and removed easily. Each of the seals in the sealing device comprises a metal plate core and a rubber bonded to the core by baking. The core has at the central part a notched portion that allows a pair of seal side portions to be opened or expanded. Replacement of the seals can be done simply by fitting new seals over the track rail from above. The interference of the seals in the assembled sealing device can be adjusted easily by adjusting the distance that the adjust screws, whose front ends contact the side surface of the core, are screwed in.

9 Claims, 7 Drawing Sheets

LINEAR MOTION ROLLING GUIDE UNIT

BACKGROUND OF THE INVENTION

1. Field of the Invention

The present invention relates generally to a linear motion rolling guide unit, applied to cutting machines, grinding machines and woodworking machines, and more specifically to a linear motion rolling guide unit with a sealing device easily mounted to the existing machines.

2. Description of the Prior Art

A conventional linear motion rolling guide unit, as shown in FIG. 15, has a track rail 1 having raceway surfaces (raceway grooves) 11 formed on both longitudinal sidewall surfaces 10 thereof and a slider 2 mounted slidable astride the track rail 1. The slider 2 is slidable relative to the track rail 1 and comprises a casing 3 having raceway surfaces (raceway grooves) at positions facing the respective raceway surfaces 11; cylindrical rollers 4 or rolling elements that allow relative movement between the facing raceway surfaces 11 and 12; and end caps 5 attached to the longitudinal ends of the casing 3, the longitudinal direction representing a direction in which the casing 3 slides. The end caps 5 each have an end seal 6 that provides longitudinal sealing between the track rail 1 and the slider 2. The end caps 5 also have a grease nipple 7 for supplying a lubricant to the rolling elements between the track rail 1 and the slider 2 and to their sliding surfaces. A retainer plate 8 is attached to the casing 3 to prevent the cylindrical rollers 4 from coming off the casing 3. An under seal 9 is provided to the undersides of the end caps 5 and the casing 3 to seal gaps between the casing 3 and end caps 5 and the longitudinal sidewall surfaces 10.

When foreign matters such as dirt, dust and chips get into the gap between the track rail 1 and the slider 2 and adhere to the raceway surfaces 11, 12, the smooth running of the rolling elements is blocked. For this reason, the end seals 6 are secured to the end surfaces of the end caps 5 with screws 13 to prevent ingress of foreign matters through the gaps at the end surfaces of the slider 2. Chips, when they are large in size and amount, may cause deformation or even damage to lip portions 14 of the side seals 6 and get into the interior of the slider 2. Thus, when the linear motion rolling guide unit, a precision device, is used under severe working environments where foreign matters produced are large in size and volume, a separate dust protection measure needs to be taken.

Under these circumstances, improvements were made by providing the conventional linear motion rolling guide unit with separate sealing devices other than the end seals 6 to offer double sealing function that will complement the function of the end seals 6.

In a sealing device disclosed in Japan Utility Model Laid-Open No. 48612/1990, for example, the end seal is clamped from both sides by an outer protector and an inner protector both having the similar shape to the end seal and these are secured to the end surfaces of the casing. This arrangement clears a major part of the chips by the outer protector, with small foreign matters, which have slipped through the clearance between the outer protector and the track rail, removed by the lip portion of the end seal. The inner protector, because it is attached to the back of the end seal, can back up the lip portion of the end seal and thereby prevent the lip portion from catching foreign matters and passing them into the interior.

Other sealing devices employed in the conventional linear motion rolling guide units include one in which a double wiper is attached to the end surfaces of the casing to form a hermetically enclosed space between the wipers and the track rail surface and in which a means is provided to introduce a pressurized air into the enclosed space (Japan Patent Laid-Open No. 264923/1994) and one in which an air blowing device is mounted to the outer end surface of the end seal through a spacer, with air outlets of the air blowing device located close to at least the upper surface of the track rail and to the raceway surface (Japan Utility Model 38177/1994).

Because the end seal is in sliding contact with the track rail at all times to remove foreign matters adhering to the track rail, degradation over time of the sealing performance due to wear is unavoidable, making it necessary to replace the worn seal. This in turn has led to growing demands for sealing devices that are easy to mount and remove. Among the sealing devices that address such demands is the one disclosed in Japan Utility Model laid-Open No. 23818/1992. This sealing device has the end seals inserted from under the end caps into the recessed grooves formed at the open end portions of the end caps, allowing one-touch installation.

Although the conventional sealing devices have high sealing capability, their application to the commercially available linear motion rolling guide units such as shown in FIG. 15 raises a problem of having to modify the fundamental specifications of the linear motion rolling guide unit.

Another problem of the conventional sealing devices is that when a seal is damaged or worn, the worn seal cannot be easily removed, nor a new replacement seal installed easily. That is, in replacing the seal, although the worn seal may be broken for removal, a new seal must be inserted from the end of the track rail. Further, simply blowing air from the air blowing device, as with the conventional sealing device, does not provide sufficient dust prevention effects when the linear motion rolling guide unit is applied to the cutting machines, grinding machines or woodworking machines.

SUMMARY OF THE INVENTION

The object of the present invention is to solve the above-mentioned problems and to provide a linear motion rolling guide unit that can be applied without modifying the existing basic specifications and which includes sealing devices easily mounted and removed to and from the slider.

This invention relates to a linear motion rolling guide unit which comprises: a track rail having raceway surfaces on longitudinally extending sidewall surfaces thereof; a slider sliding on the track rail through rolling elements; and sealing devices secured to end surfaces of the slider and adapted to slide on the track rail; wherein the sealing devices comprises: seal cassettes having top portions located on the upper side of the track rail and side portions located on both sides of the top portions and on both sides of the track rail; seals accommodated in the seal cassettes and having seal top portions in sliding contact with the upper surface of the track rail and a pair of seal side portions on both sides of the seal top portions that can be opened away from each other; and scraper plates accommodated in, and located at the end surfaces of, the seal cassettes and positioned above the track rail in such a way as to form a small gap between the scraper plates and the track rail.

The seal comprises a metal plate core and an elastic member bonded to the core by baking, and the metal plate core has a notch portion at the center so that the seal side portions of the seal can be opened away from each other. Because the two side portions of the seal are connected together at the center of the top portion only by an elastic member baked to the core or by the elastic member and a flexible portion, the pair of side portions can easily be opened or expanded.

In replacing the seal, the pair of side portions of the old worn seal that straddle the track rail are opened, the old seal is removed upwardly of the track rail, the pair of side portions of a new seal are opened, and the new seal is fitted over the track rail from above so that the seal straddles the track rail. The seal can be removed and installed from above the track rail, eliminating the need to move the seal to the end of the track rail for removal or installation as required by the conventional unit. With this sealing device, the replacement of the seal can be done easily.

The sealing device of this invention is provided with adjust means to adjust the interference with the track rail of the seals. The adjust means comprise adjust screws that are screwed into the side surface of the seal cassette and whose front ends engage with the side surface of the core of the seals. The adjust means alternatively include an engagement stepped portion formed in the seal cassette in which the seals are fitted, and tapered chamfers formed at the edges of the seals to facilitate their insertion to the engagement stepped portion. Fitting the seals into the seal cassette automatically adjusts the interference of the seals.

Because the seals are fitted under pressure into the seal cassette, it is desired that the seal cassette be formed with a seal removing hole at the edge of the engagement stepped portion to facilitate the removal of the seal from the seal cassette.

The seals have oil reservoir portions formed at a central part of the seal top portions and oil supply holes which communicate the surfaces of the seal top portions with the oil reservoir portions and which supply grease to seal surfaces in sliding contact with the upper and sidewall surfaces of the track rail. The seals have at least two seal members and there is an oil supply spacer between the seal members which has an opening communicating with the oil supply holes and being open at the bottom side. This allows the grease to be supplied to the seal surfaces in sliding contact with the track rail. If the oil supply holes are located at appropriate positions in the seals, it is possible to supply grease to the sliding contact surfaces simply by stacking the two seals without using the oil supply spacer. In that case, the sealing device becomes compact. The number of seals to be stacked together is not limited to two. Three or more seals may be stacked, or a single seal may be used.

The seal preferably has a double lip which comprises two lips in sliding contact with the upper surface and the side surfaces of the track rail, respectively. One of the lips has a function of preventing ingress of foreign matters from outside and the other retaining oil.

If the sealing device of the linear motion rolling guide unit is mounted to the slider through a mounting plate, it can be used on a variety of kinds of existing rolling guide units without making any changes to the basic specifications. Because the same sealing device can be applied to any linear motion rolling guide unit with different slider shapes and sizes as long as the unit uses the track rail of the same standard, the linear motion rolling guide unit of this invention has a wide range of applications.

Because the sealing device can be mounted easily to the end surfaces of the slider in an existing linear motion rolling guide unit already incorporated in an equipment such as a cutting machine, this invention can meet the demand for improving the sealing performance of the linear motion rolling guide unit in existing machines.

This linear motion rolling guide unit permits easy replacement of the seals of the sealing device while the unit remains incorporated in equipment such as cutting machines. The replacement involves removing the mounting bolts that fasten the seals to the seal cassette; moving old worn seals slightly in an axial direction; opening the pair of side portions of the seals straddling the track rail; removing the seals upwardly from the track rail; and opening the pair of side portions of new seals and fitting the new seals over the track rail from above so that they straddle the track rail. Since the seals can be mounted or dismounted to and from the track rail from above in this way, the seals do not need to be installed or removed via the end of the track rail unlike the conventional unit, thus simplifying the seal replacement procedure.

DETAILED DESCRIPTION OF EMBODIMENTS

Figure 1:
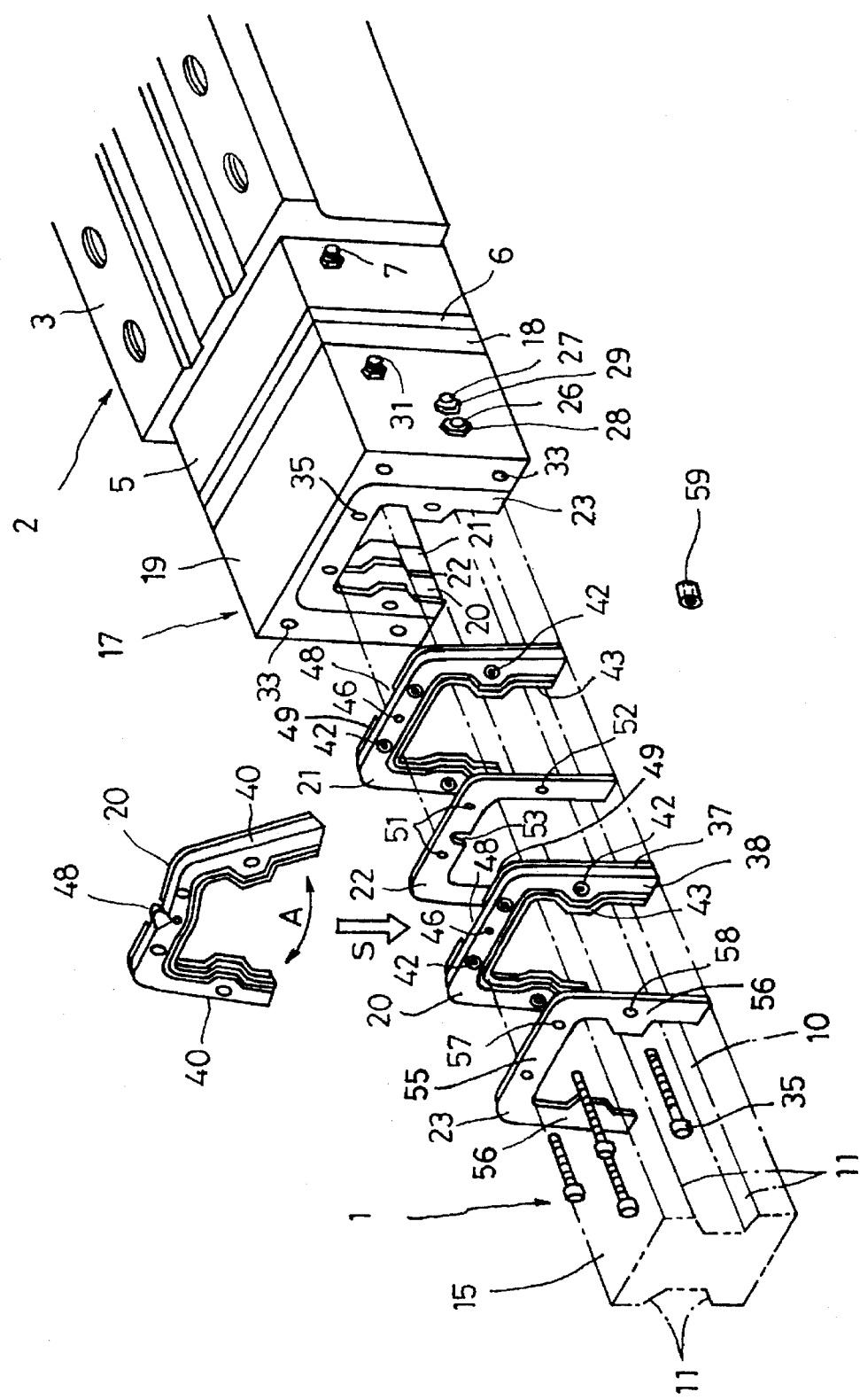
FIG. 1 is a perspective view showing one embodiment of the linear motion rolling guide unit of this invention.
Figure 15:
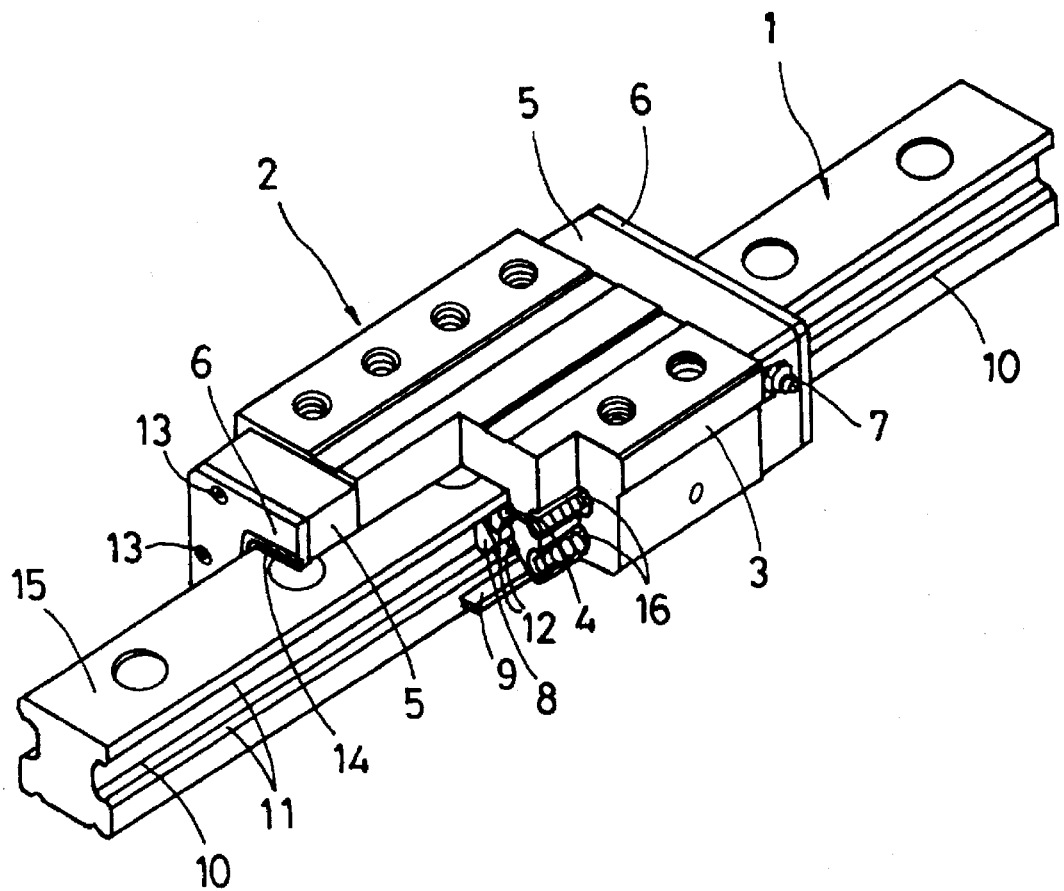
FIG. 15 is a perspective view of a conventional linear motion rolling guide unit.

Now, embodiments of the linear motion rolling guide unit according to this invention will be described by referring to the accompanying drawings. In the drawings, components having identical constructions and functions with those of the conventional linear motion rolling guide unit as shown in FIG. 15 are given like reference numbers. Although FIG. 1 shows the linear motion rolling guide unit to have the sealing device on the left side, which is shown exploded, the similar sealing device can also be mounted on the right side, too.

This linear motion rolling guide unit has a track rail 1 formed with raceway surfaces (raceway grooves) 11 on longitudinal sidewall surfaces 10 thereof and a slider 2 mounted slidable astride the track rail 1. The track rail 1 is I-shaped in cross section with the sidewall surfaces 10 recessed. The slider 2 has a casing 3 that is slidable relative to the track rail 1 and has raceway surfaces at positions facing the raceway surfaces 11 on the track rail 1; rolling elements (balls and rollers) that roll to allow relative motion between the opposing raceway surfaces 11; and end caps 5 attached to the longitudinal ends of the casing 3, the longitudinal direction being the direction in which the casing 3 slides. The end cap 5 has an end seal 6 that provides longitudinal sealing between the track rail 1 and the slider 2 and also has a grease nipple 7 that supplies lubricant to the rolling elements between the track rail 1 and the slider 2 and to the raceway surfaces 11. The retainer plates and under seals are provided in the same way as in FIG. 15.

The slider 2 is mounted astride the track rail 1 and freely slides along the track rail 1 through the rolling elements that circulate along the raceway surfaces. The rolling elements that travel loaded along the raceway surfaces 11 of the track rail 1 are introduced into direction changing passages formed in the end caps 5 and further into return passages formed in the casing 3 parallel to the raceway surfaces. The rolling elements thus circulate endlessly through the endless circulation passage. The slider 2 is allowed to slide relative to the track rail 1 by the rolling elements traveling loaded between the raceway surfaces of the slider 2 and the raceway surfaces 11 of the track rail 1.

A sealing device 17 is mounted on the outer end surface of the end seal 6 through a mounting plate 18 to improve the sealing performance. The sealing device 17 comprises a seal cassette 19 U-shaped in cross section, two seals 20, 21 installed in the seal cassette 19, an oil supply spacer 22 clamped between the seals 20, 21 and a scraper plate 23 mounted on the outer end surface of the seal 20.

Figure 2:
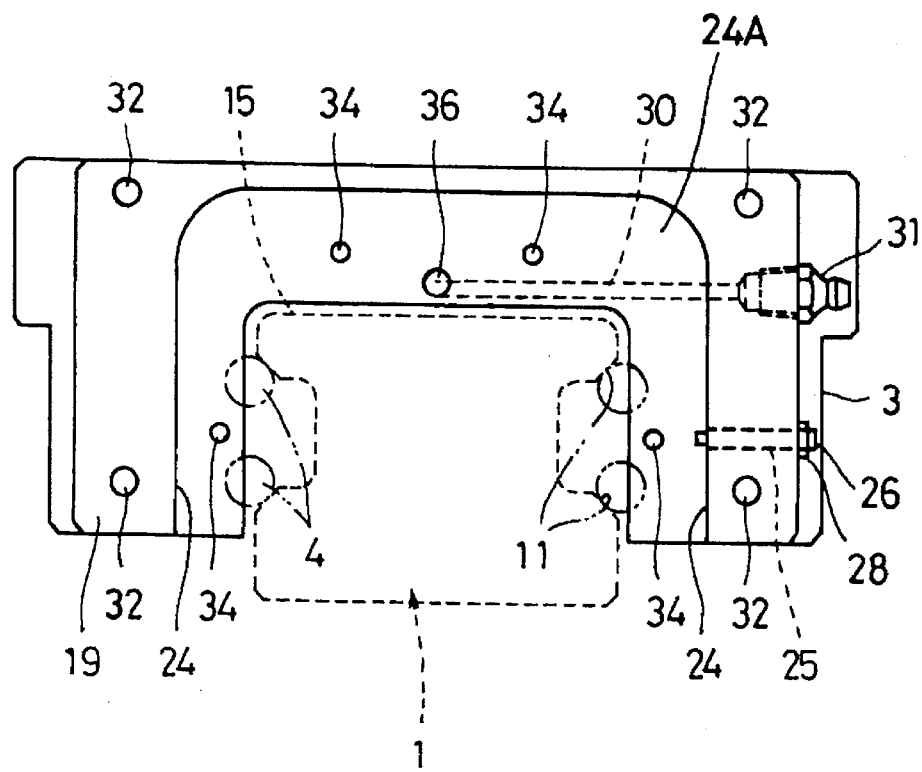
FIG. 2 is a front view of the sealing device of FIG. 1 with a seal removed.
Figure 3:
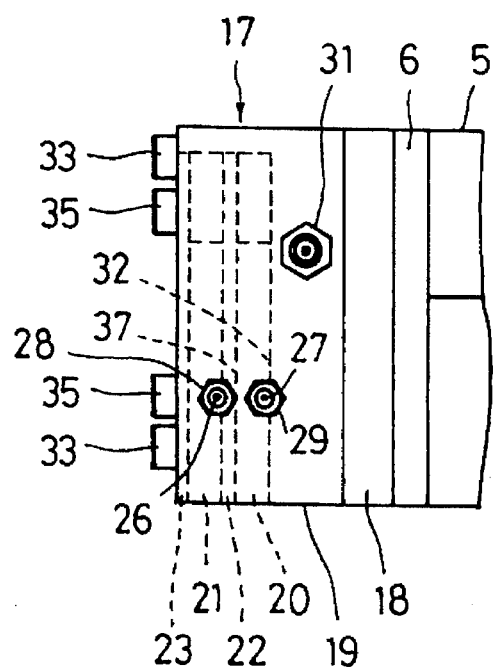
FIG. 3 is a side view of the sealing device of FIG. 2.

The seal cassette 19, as shown in FIG. 2, is roughly U-shaped in cross section and has an engagement step 24 on the inner side facing the track rail 1 to accommodate the seals 20, 21 and the scraper plate 23. The seal cassette 19 has two front and rear screw holes 25 passing from the side surface toward the engagement stepped portion 24 on the inner side. The adjust screws 26, 27 are screwed into the respective screw holes 25 from the side so that the front ends of these screws engage the side of a core 37 of the seals 20, 21 installed at the engagement stepped portion 24. By using the adjust screws 26, 27, the interference with the track rail of the seals 20, 21 can be adjusted by the adjust screws 26, 27. The adjust screws 26, 27 are locked by lock nuts 28, 29 respectively.

The seal cassette 19 is formed with an oil supply hole 30 extending from the side toward the center to supply grease from a grease nipple 31 attached to the side of the seal cassette 19 to a location facing the top surface 15 of the track rail 1. At the central part of an inner stepped portion 24A of the engagement stepped portion 24 is formed an oil supply hole 36 that communicates with the oil supply hole 30. The grease supplied from the grease nipple 31 is fed to the central portion of the inner stepped portion 24A through the oil supply hole 30 and oil supply hole 36.

At four corners of the seal cassette 19 are formed throughholes 32, into which cassette mounting bolts 33 are inserted to fasten the seal cassette 19 to the end cap 5 through the mounting plate 18. The through-holes 32 are formed as slots so that mounting of the seal cassette 19 to the slider 2 can be done easily. The inner stepped portion 24A is formed with four screw holes 34 that receive mounting bolts 35 to fasten the seals 20, 21 and the scraper plate 23 to the engagement stepped portion 24.

Figure 4:
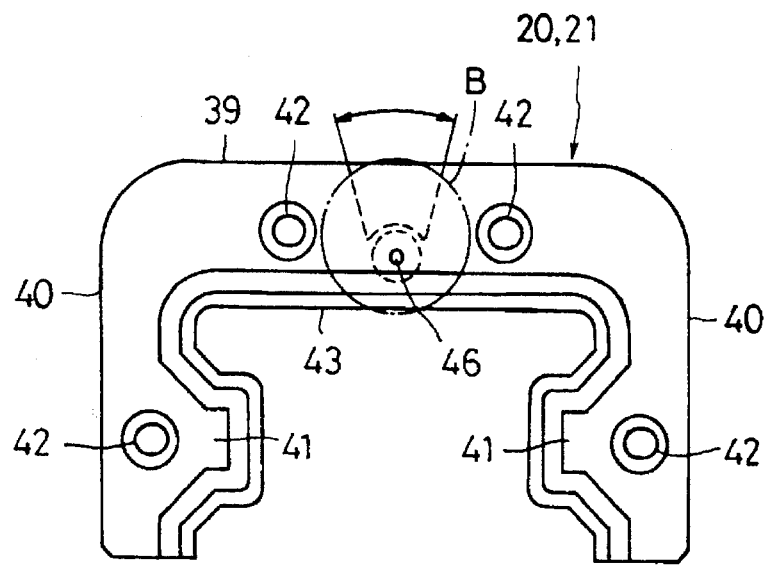
FIG. 4 is a front view of the seal of FIG. 1.
Figure 5:
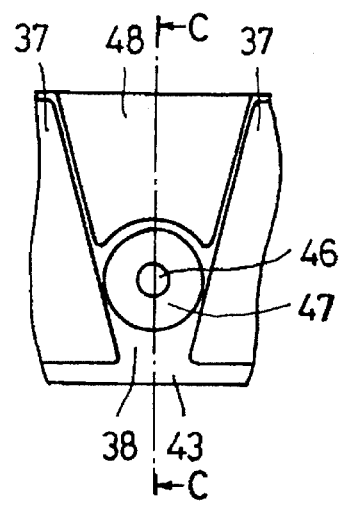
FIG. 5 is an enlarged view of a part B of the seal of FIG. 4 as seen from the back.
Figure 6:
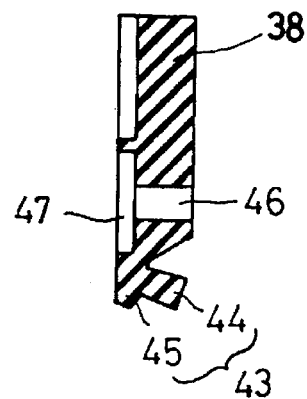
FIG. 6 is a cross section of the seal taken along the line C—C of FIG. 5.

As shown in FIGS. 4, 5 and 6, the both seals 20, 21 have the same structure and shape. The seals 20, 21 are profiled to follow the I-shaped cross section of the track rail 1 to seal a gap between the track rail 1 and the slider 2. The seals 20, 21 have a top portion 39 and a pair of side portions 40 and are made of a metal plate core 37 bonded with a rubber member 38 by baking. The side portions 40 of the seals 20, 21 are formed with projecting portions 41 that engage with the raceway surfaces 11 of the I-cross section track rail. The side portions also have through-holes (slots) 42 at positions corresponding to the screw holes 34 formed in the seal cassette 19. The seals 20, 21 have a lip portion 43 of rubber in the form of a double lip made up of front and rear lips 44, 45. The lip portion 43 covers and contacts the top surface 15 and the sidewall surfaces 10 of the track rail 1 to remove foreign matters such as dust particles entering from outside and hold oil inside. The lip portion 43 has a portion that seals the sidewall surfaces 10 of the track rail 1 formed integral with a portion that seals the top surface 15 of the track rail 1, so that it is easily handled compared with the one that has separate portions.

At the central portion B on the back of the top portion 39, the seals 20, 21 have a notch portion 48, which is a sector part cut from the core 37. Alternatively, the central portion B may be formed as a flexible portion that can be deformed. The rubber member 38 also has a recess whose contour follows the sector shape of the notch portion 48. The central portion B has an oil supply hole 46, around which the rubber member 38 is formed into a circular recess or an oil reservoir 47. The core 37 has the sector-shaped notch portion 48, so that the pair of the side portions 40 of the seals 20, 21 can be opened in a direction A of FIG. 1. The core 37 may be formed in two pieces joined at the notch portion 48 or in one piece with a deformable flexible portion. The sector-shaped notch portion 48 of the core 37 is formed narrow on the lip side to maintain the necessary lip strength and, on the upper side which has little effect on the sealing performance, is formed wide, thereby allowing the seals to be opened easily in the direction A. Because of this structure, the seals 20, 21 do not need to be moved to the end of the track rail 1 before being removed. Instead, they can be directly dismounted and remounted from above the track rail 1 in a direction of arrow S in FIG. 1, i.e., in a direction perpendicular to the axial direction of the track rail 1.

Figure 7:
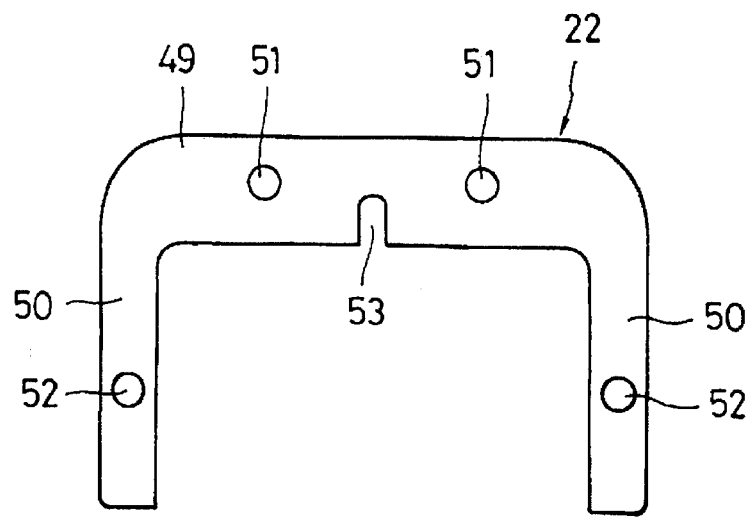
FIG. 7 is a front view of the oil supply spacer of FIG. 1.

As shown in FIG. 7, the oil supply spacer 22 is shaped like an inverted letter U and, unlike the seals 20, 21, have no projecting portions that engage with the raceway surfaces 11 of the track rail. The top portion 49 of the spacer 22 is formed with two through-holes 51 and the side portions 50 of the spacer 22 are each formed with one through-hole 52. These through-holes 51, 52 are located at positions corresponding to the through-holes 42 of the seals 20, 21. The central part of the top portion 49 is formed with an opening 53 that opens downwardly.

Figure 8:
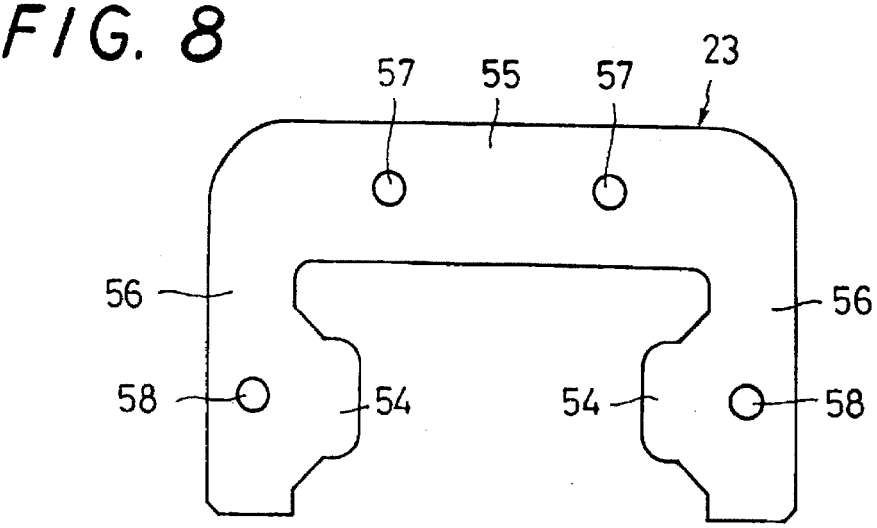
FIG. 8 is a front view of the scraper plate of FIG. 1.

As shown in FIG. 8, the scraper plate 23 is made of a thin plate whose contour follows the cross section of the track rail 1. The scraper plate 23, when mounted on the slider 2, does not contact the track rail 1 leaving a small gap (0.2 mm) between them and removes large foreign substances adhering to the track rail 1. The scraper plate 23, like the seals 20, 21, has projecting portions 54 that engage with the raceway surfaces 11 of the track rail 1. A top portion 55 of the scraper plate 23 has two through-holes 57 and side portions 56 have one through-hole 58 each. These through-holes 57, 58 are located at positions corresponding to the through-holes 42 of the seals 20, 21.

The sealing device 17, as shown in FIG. 1, is assembled by fitting the seal 21, oil supply spacer 22, seal 20 and scraper plate 23 in that order into the engagement stepped portion 24 of the seal cassette 19, inserting the four mounting bolts 35 into the through-holes of these members and screwing the bolts into the screw holes 34 in the seal cassette 19. Because the through-holes 42 formed in the seals 20, 21 are slots, it is possible to adjust the position of the seals 20, 21 when mounting them on the seal cassette 19. The through-holes 42 in the rubber member of the seals 20, 21 are fitted with a collar 59 to prevent deformation of the rubber member when fastened with the mounting bolts 35. The sealing device 17 is secured to the slider 2 through the mounting plate 18 by the four cassette mounting bolts 33. The mounting plate 18 is attached to the slider 2 by using the bolts that are used to mount the end cap 5 and the end seal 6 to the casing 3. Then, the sealing device 17 is mounted to the mounting plate 18 by the cassette mounting bolts 33.

Hence, the sealing device 17 can be mounted easily to the end surface of the slider 2 even in the existing linear motion rolling guide unit without changing the basic specifications at all. The use of the sealing device 17 on the existing linear motion rolling guide unit improves the sealing function of the unit and, particularly when the unit is used under the environment where foreign matters such as chips are produced in large amounts, provides a high dust removing capability and a long service life.

The sealing function of the sealing device 17 can be maintained in a proper condition by adjusting the interference of the seals 20, 21. The interference of the seals 20, 21 can be adjusted by the adjust screws 26, 27 whose front ends engage with the side of the core 37 of the seals 20, 21 installed in the seal cassette 19. The seals 20, 21 are set at the interference of 0.5 mm, which is larger than normal to increase the dust prevention capability.

Figure 9:
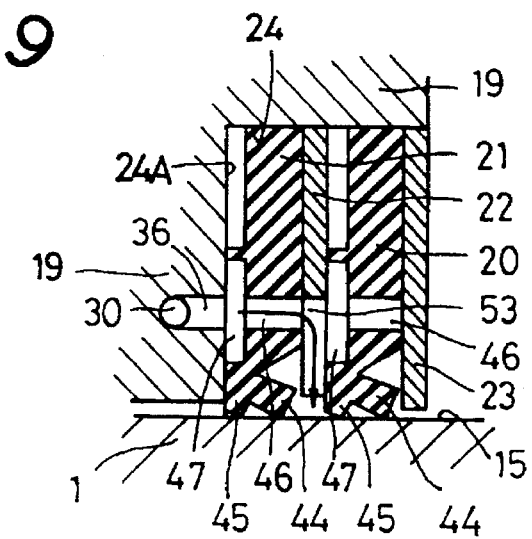
FIG. 9 is a cross section of the central portion of the sealing device with the seal set in the seal cassette.

When the interference of the seal is large, the lips 44, 45 sustain significant wear, necessitating oil lubrication of contacting portions between the track rail 1 and the lips 44, 45. For this reason, the sealing device 17 is supplied with a grease from the grease nipple 31 provided to the side surface of the seal cassette 19. FIG. 9 is a cross section of a central portion of the sealing device, showing the path in which the grease is fed. The grease supplied from the grease nipple 31 provided to the side surface of the seal cassette 19 flows through the oil supply hole 30, that leads to the central portion of the seal cassette 19, and into the oil supply hole 36 that opens to the inner stepped portion 24A. The grease then moves into the oil reservoir 47 provided at the back of the inner seal 21, from which it flows through the oil supply hole 46 into the oil supply spacer 22. The opening 53 of the oil supply spacer 22 opens downwardly so that the grease is fed from the opening 53 to between the seals 20, 21 (between the lip 45 of the seal 20 and the lip 44 of the seal 21), spreading over the top surface 15 and the sidewall surfaces 10 of the track rail 1. The oil supply hole 46 of the outer seal 20 is closed by the scraper plate 23 arranged on the outer side of the outer seal 20, so that the grease is not discharged outside.

The sealing device 17 removes a large amount of large-sized foreign matters such as chips adhering to the top surface 15 and the longitudinal sidewall surfaces 10 of the track rail 1 by the scraper plate 23. Minute foreign matters that have entered through the gap between the scraper plate 23 and the track rail 1 are blocked by the lip 44 of the seals 20, 21 from further moving inwardly. For the fine foreign particles that have slipped through the lip portion 43, the end seals 6 will block further ingress as with the conventional device. Hence, the linear motion rolling guide unit fitted with the sealing device 17 offers an extremely high dust elimination capability.

Replacement of the seals 20, 21 involves removing the mounting bolts 35, slightly moving the scraper plate 23 and the seals 20, 21 axially, opening the seals 20, 21 and moving them upward of the track rail 1. Next, new seals 20, 21 are installed as follows. With the seals 20, 21 opened in the direction A of FIG. 1, they are fitted over the track rail 1 from above and closed to make the projecting portions 41 engage with the raceway surfaces 11 of the track rail 1. Then the seals 20, 21 are inserted into the engagement stepped portion 24 of the seal cassette 19 and fastened with the mounting bolts 35. Because the seals 20, 21 can be opened in this manner, i.e., because the core 37 has the notch portion 48 at which the both sides of the core 37 are connected only with the rubber member, installing the new seals 20, 21 into the seal cassette 19 does not require inserting them from the end of the track rail 1. Hence, the sealing device 17 allows easy mounting and dismounting of the seals 20, 21 to and from the linear motion rolling guide unit applied to long track rails 1.

Figure 10:
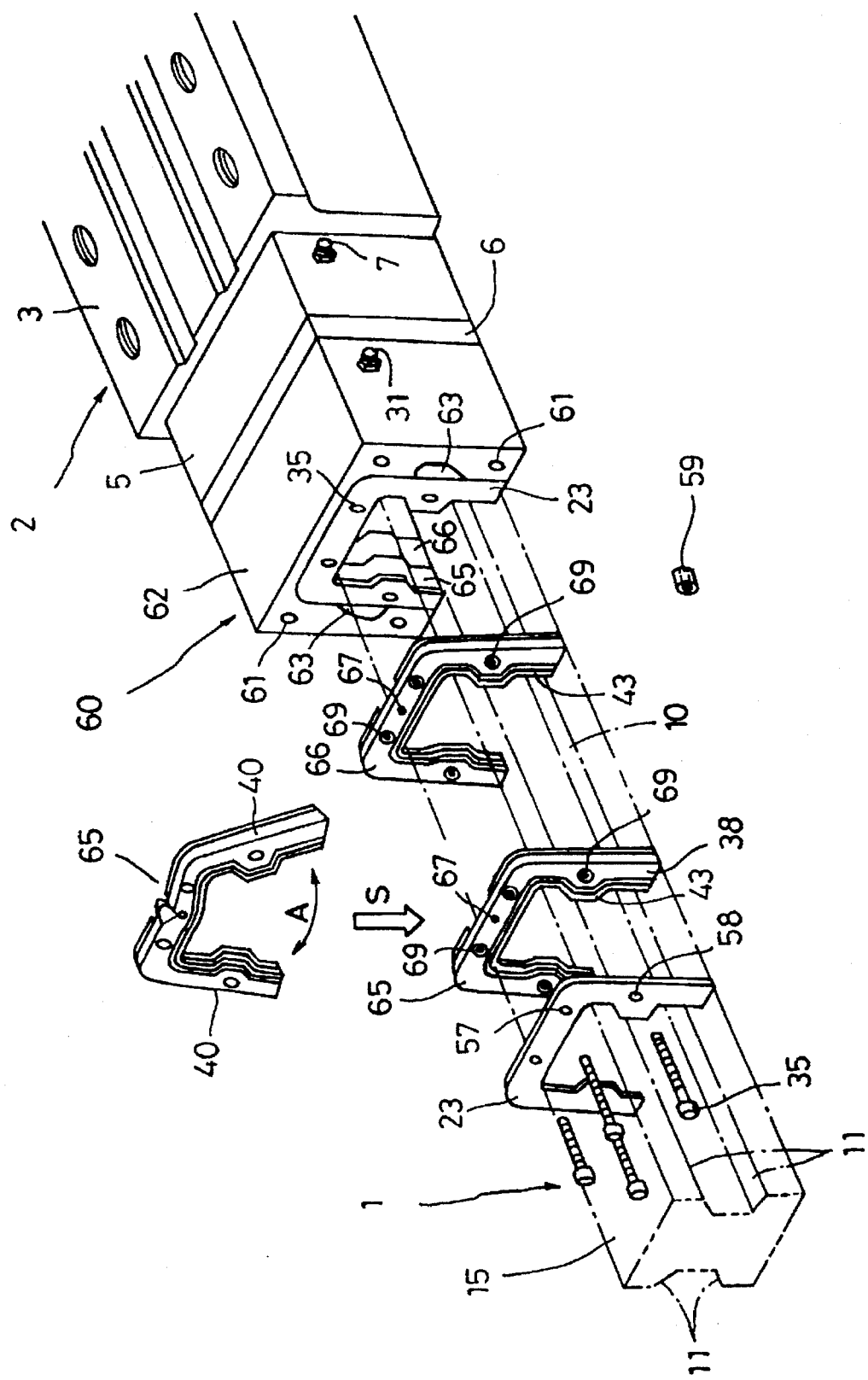
FIG. 10 is a perspective view of another embodiment of the linear motion rolling guide unit according to this invention.
Figure 11:
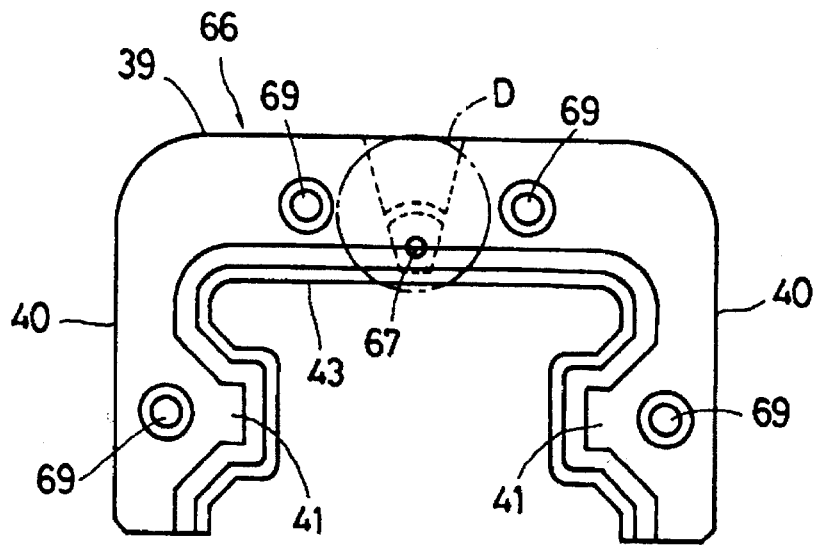
FIG. 11 is a front view of the seal in the linear motion rolling guide unit of FIG. 10.

Next, by referring to FIG. 10, another embodiment of the linear motion rolling guide unit of the present invention will be described. Differences between this embodiment and the preceding embodiment are described in the following. In other respects these two embodiments have similar construction, and components having the identical functions are assigned like reference numbers and their repetitive explanations are omitted.

A sealing device 60 is mounted directly to the end surface of the slider 2, not through the mounting plate 18. Because it is directly mounted without using the mounting plate 18, the fixing of the sealing device 60 to the slider 2 is done by using fixing bolts 61 that are used to secure the end cap 5 to the casing 3. Although this arrangement makes the end cap 5 more likely to deviate from the correct position than in the first embodiment and the whole sealing device 60 cannot be replaced, it is more compact than the sealing device 17.

Figure 12:
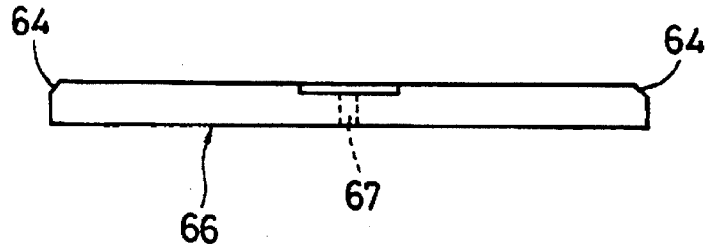
FIG. 12 is a plan view of the seal of FIG. 11.
Figure 13:
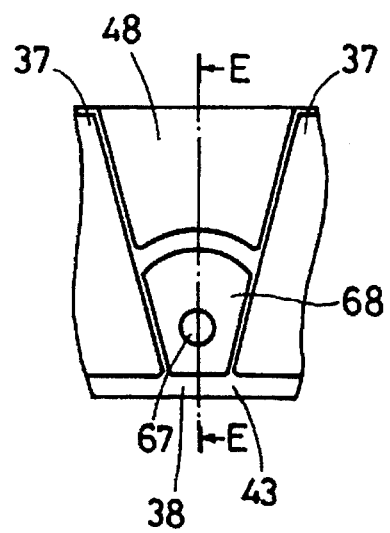
FIG. 13 is an enlarged view of a part D of the seal of FIG. 11 as seen from the back.
Figure 14:
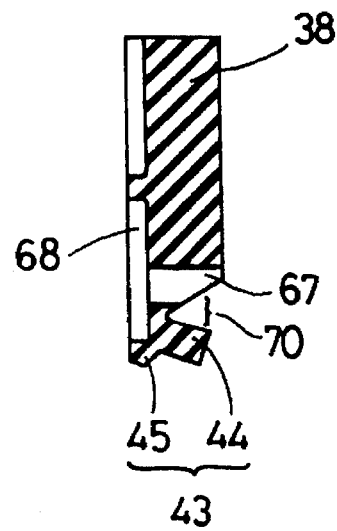
FIG. 14 is a cross section of the seal taken along the line E—E of FIG. 13.

Further, the sealing device 60 has no adjust screws 26, 27 for adjusting the interference of the seal. In this sealing device 60, simply fitting the seals 65, 66 in the seal cassette 62 automatically adjusts the interference to an appropriate value. That is, the fit between the seals 65, 66 and the seal cassette 62 is a so-called interference fit. Installing the seals 65, 66 into the seal cassette 62 automatically causes the interference between the seals 65, 66 and the track rail 1 to be set to an appropriate level. Because the seals 65, 66 are fitted under pressure into the seal cassette 62, it is necessary to provide a means for facilitating the removal of the seals 65, 66 from the seal cassette 62. For this purpose, the front surface of the seal cassette 62 is formed with a seal removing hole 63. To facilitate insertion of the seals 65, 66 into the seal cassette 62, the seals 65, 66 are given tapered chamfers 64 on the back, as shown in FIG. 12.

Further, since the sealing device 60 is so constructed that the interferences of the seals are automatically set to an appropriate value by simply fitting the seals 65, 66 into the seal cassette 62, the through-holes 69 in which to insert the mounting bolts 35 are formed circular, not elongate as with the seals 20, 21.

As shown in FIGS. 11, 12, 13 and 14, the sealing device 60 does not have the oil supply spacer 22 and thus the construction slightly differs from that of the seals 20, 21 of the first embodiment. An oil reservoir portion 68 around an oil supply hole 67 is sector-shaped, and the rubber member at the lower part of the oil reservoir portion 68 and at the lip portion 43 are formed thin (thin region 70). That is, the oil supply hole 67 is formed in the thin region 70 and located lower than the oil supply hole 46 of the seals 20, 21.

The sealing device 60 is assembled by stacking the two seals 65, 66 of the same structure together, inserting them into the seal cassette 62, fitting the scraper plate 23, and then fastening them by the mounting bolts 35. In the sealing device 60 assembled in this manner, when grease is supplied from the grease nipple 31 provided to the side surface of the seal cassette 62, the grease flows through the oil supply hole 30 in the seal cassette 62 into the oil supply hole 67 in the inner seal 66. Then, the grease flows out through the oil reservoir portion 68 at the back of the inner seal 66 and through the thin region 70 of the lip portion 43, lubricating the contact portions between the track rail 1 and the lip portion 43 of the seals 65, 66. In other words, the grease is supplied and held between the lip 44 of the inner seal 66 and the lip 45 of the outer seal 65. In this embodiment, because the oil supply hole 67 is formed in the thin region 70 in both the seals 65 and 66, providing the scraper plate 23 on the outer side of the outer seal 65 does not close the oil supply hole 67 of the outer seal 65, so that some amount of grease will leak out. If the leakage should pose a serious problem, the outer seal 65 may be plugged or the seal 20 of the first embodiment may be used instead. Alternatively, a seal 65 with no oil supply hole 67 may be used.

The sealing device 60 has the identical construction with the sealing device 17 of the first embodiment except in the above respect and provides the similar dust clearing capability. These two embodiments also provides the similar level of ease with which to dismount and remount the seals. The sealing device 60 has an advantage over the sealing device 17 that it is more compact.

What is claimed is:

1. A linear motion rolling guide unit comprising:

a track rail having raceway surfaces on longitudinally extending sidewall surfaces thereof;

a slider sliding on the track rail through rolling elements; and sealing devices secured to end surfaces of the slider and adapted to slide on the track rail;

wherein the sealing devices comprises:

seal cassettes having top portions located on the upper side of the track rail and side portions located on both sides of the top portions and on both sides of the track rail;

seals accommodated in the seal cassettes and having seal top portions in sliding contact with the upper surface of the track rail and a pair of seal side portions on both sides of the seal top portions that can be opened away from each other; and scraper plates accommodated in, and located at the end surfaces of, the seal cassettes and positioned above the track rail in such a way as to form a small gap between the scraper plates and the track rail.

2. A linear motion rolling guide unit according to claim 1, wherein the seals comprise metal plate cores and elastic members bonded to the cores by baking, and the metal plate cores each have a notch portion at the center so that the seal side portions can be opened away from each other.

3. A linear motion rolling guide unit according to claim 1, wherein the sealing devices have means to adjust interferences of the seals.

4. A linear motion rolling guide unit according to claim 3, wherein the adjust means are adjust screws that are screwed into the side surfaces of the seal cassettes and whose front ends contact the side surfaces of the metal plate cores.

5. A linear motion rolling guide unit according to claim 3, wherein the adjust means comprise a stepped portion formed in the seal cassette in which the seals are fitted and tapered chamfers formed at edges of the seals to facilitate their insertion to the stepped portion.

6. A linear motion rolling guide unit according to claim 5, wherein the seal cassettes have seal removing holes formed at the edge of the stepped portion.

7. A linear motion rolling guide unit according to claim 1, wherein the seals have oil reservoir portions formed at central parts of the seal top portions and oil supply holes which communicate the surfaces of the seal top portions with the oil reservoir portions and which supply grease to seal surfaces in sliding contact with the upper and sidewall surfaces of the track rail.

8. A linear motion rolling guide unit according to claim 7, wherein the seals have at least two seal members and there is an oil supply spacer between the seal members which has an opening communicating with the oil supply holes and being open at the bottom side.

9. A linear motion rolling guide unit according to claim 1, wherein the seals each have a double lip which comprises two lips in sliding contact with the upper surface and the side surfaces of the track rail, respectively.

* * * * *